Oct. 7, 1958          C. B. SPASE          2,855,080

TORQUE METERING TRANSMISSION

Filed March 4, 1957          2 Sheets-Sheet 1

INVENTOR.
Charles B. Spase.
BY
L. Emmett Thompson
ATTORNEY.

United States Patent Office 2,855,080
Patented Oct. 7, 1958

2,855,080

TORQUE METERING TRANSMISSION

Charles B. Spase, Syracuse, N. Y., assignor to Lipe-Rollway Corporation, Syracuse, N. Y., a corporation of New York Application March 4, 1957, Serial No. 643,661

2 Claims. (Cl. 192—104)

This invention relates to torque metering transmission units of the type used in connection with automotive accessories to prevent improper operation of the accessories.

It often happens that present day automotive engines having very high speeds will cause faulty operation of the automotive accessories, such as oil pumps for power steering, air compressors, and the like. In oil pumps, for example, if there is a direct connection between the pump shaft and the driving shaft, when the driving shaft is rotated at high engine speeds, the phenomenon known as "cavitation" will take place in the pump. Accordingly, it is an object of this invention to provide a torque metering transmission unit of a compact size which may be used in connection with automobile accessories.

More specifically, it is an object of this invention to provide such a transmission unit wherein the amount of torque to be transmitted to the accessory may be limited to a predetermined level.

The invention consists in the novel features and in the combinations and constructions hereinafter set forth and claimed.

In describing this invention, reference is had to the accompanying drawings in which like characters designate corresponding parts in all the views.

In the drawings—

Figure 1:
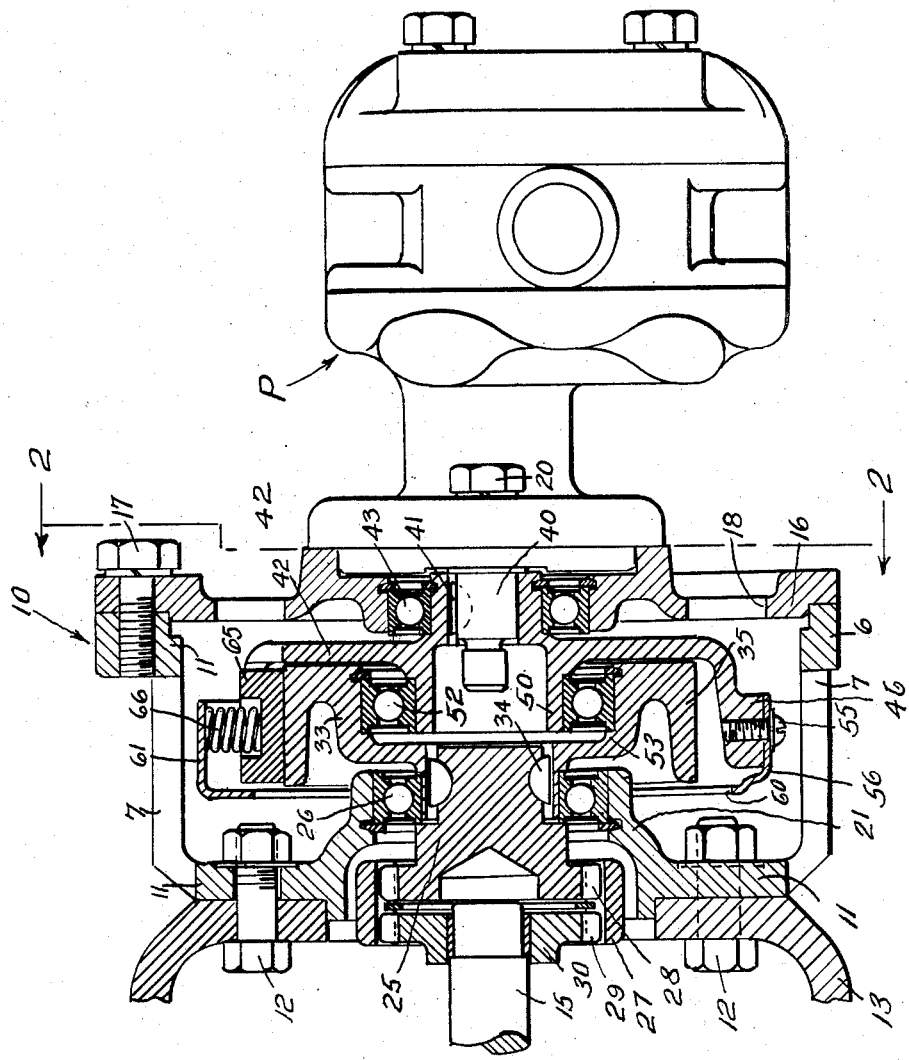
Figure 1 is a cross section taken on line 1—1 of Figure 2.
Figure 2:
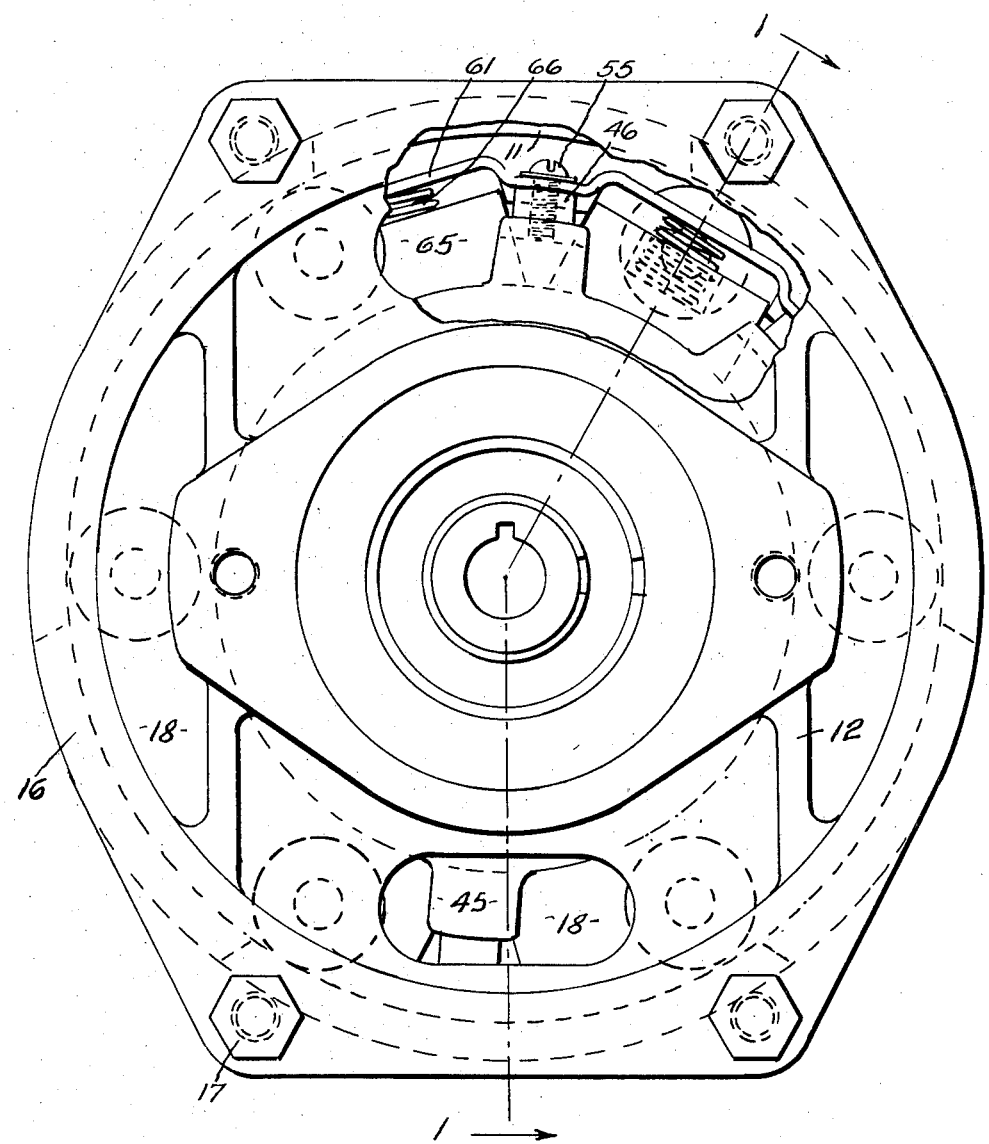
Figure 2 is a view taken looking in the direction of line 2—2 of Figure 1.

The transmission unit, generally designated at 10 comprises a cup-shaped portion 6 having axial access apertures 7 and an inner wall 11 which is affixed by fasteners 12 to a fixed housing 13 in which a drive shaft 15 is journalled for rotation. The transmission unit further has an outer wall 16 which is affixed to the cup-shaped portion 6 by the fasteners 17. The outer wall 16 has a plurality of radial apertures 18 providing further access to the interior of the unit. The oil pump designated at P, which does not per se comprise part of this invention, is affixed to the outer wall 16, as by fasteners 20.

The inner wall 11 of the housing 10 is formed with a central hub portion 21 apertured to receive a bearing 26. The outer wall 16 of the housing is also formed with a central aperture to receive a bearing 43, these bearings being arranged in axial alignment with the drive shaft 15. A driving member 33 is formed with an offset annular flange 35 providing a friction drum surface. The driving member is formed with a hub portion journalled in the bearing 26 and being operatively connected to a coupler member 25, as by keys 34. The coupler member 25 is operatively connected to the drive shaft 15 through an internal tooth ring member 27 engaging gear teeth 28 on the coupler and gear teeth 29 on a member 30 affixed to the drive shaft 15.

The driven shaft 40 of the pump P extends into the housing 10 and is fastened to the driven member 42 by a key 41. The driven member 42 may be journalled for rotation in the bearing 43 carried by the outer wall 16. The driven member has a plurality of radially extending spokes 45 which terminate in a plurality of bosses 46 which encircle the drum surface 35 of the driving member.

As will be seen from Figure 1, the driven member 42 has a hub portion 50 which is mounted in a bearing 52 journalled in a recessed inner portion 53 of the driving member.

Affixed to the bosses 46, as by fasteners 55, is an annular ring 56 having a central aperture 60. The ring 56 has a flange 61 which encircles the drum surface 35 of the driving member. Mounted between the flange 61 and the drum surface 35 are a plurality of friction shoes 65. These friction shoes are yieldably urged into engagement with the drum surface 35 by a plurality of compression springs 66 carried by the flange 61 of the ring 56.

In operation, when the driving member 33 is caused to be rotated by the drive shaft 15, the torque in the driving member will be transmitted to the driven member 42 by means of the friction shoes 65, compression springs 66, and rings 56, thus rotating the driven shaft 40 of the accessory P. When the speed of the driving member 33 reaches a certain predetermined level, centrifugal force will cause the pressure that the springs 66 exert to be decreased, thus allowing slippage to take place between the friction shoes 65 and the drum surface 35, therefore, the driven shaft 40 will never be rotated above a certain predetermined speed regardless of the speed of the drive shaft 15, thus insuring that "cavitation," as in the example of an oil pump, or the like, will not cause a faulty operation of the driven accessory.

It will be seen from Figure 1, that the transmission unit 10 is of a small compact size so that it may be inserted between the fixed housing 13 and the accessory P without taking up a great deal of space. This is considered very important since with the multiplicity of accessories in today's automotive vehicles space is at a premium.

What I claim is:

1. A torque metering transmission and accessory mount for a driving element having an end wall and a drive shaft journalled therein, comprising a housing formed with inner and outer walls arranged in spaced relation and being formed with central axially aligned apertures adapted to be aligned with said drive shaft, a driving member journalled in the aperture in said inner wall, a driven member journalled in part in the aperture in said outer wall and in part in said driving member, said driving member including a friction drum surface, said driven member having an annular series of friction shoes encircling said drum surface, spring means yieldingly urging said shoes into frictional engagement with said drum surface, the outer wall of said housing adapted to have a driven accessory affixed thereto and to have a driven shaft thereof extend into said housing and be operatively connected to said driven mmeber.

2. A torque metering transmission and accessory mount for a driving element having an end wall and a drive shaft journalled therein, comprising a housing formed with inner and outer walls arranged in axial spaced relation and being formed with central axially aligned apertures adapted to be aligned with said drive shaft, a driving member formed with a friction drum surface and having a hub portion journalled in the aperture of said inner wall, a driven member having a first hub portion journalled in the aperture in said outer wall, said driven member having a second hub portion journalled in said driving member, the outer surface of said outer wall adapted to have a driven oil pump affixed thereto and to have a driven shaft thereof extend into said housing and be operatively connected to said driven member, said driven member having an annular series of friction shoes engaging said drum surface, and spring means yieldingly urging said shoes into frictional engagement with said drum surface.

References Cited in the file of this patent

UNITED STATES PATENTS

| | | |
|---|---|---|
| 1,916,126 | Nardone | June 27, 1933 |
| 1,924,322 | Knight | Aug. 29, 1933 |
| 2,758,689 | Spase | Aug. 14, 1956 |

FOREIGN PATENTS

| | | |
|---|---|---|
| 117,467 | Sweden | Oct. 22, 1946 |